Feb. 11, 1936.                    C. H. WISE                    2,030,808
                             SPILLED BATCH CATCHER
                              Filed Dec. 15, 1934
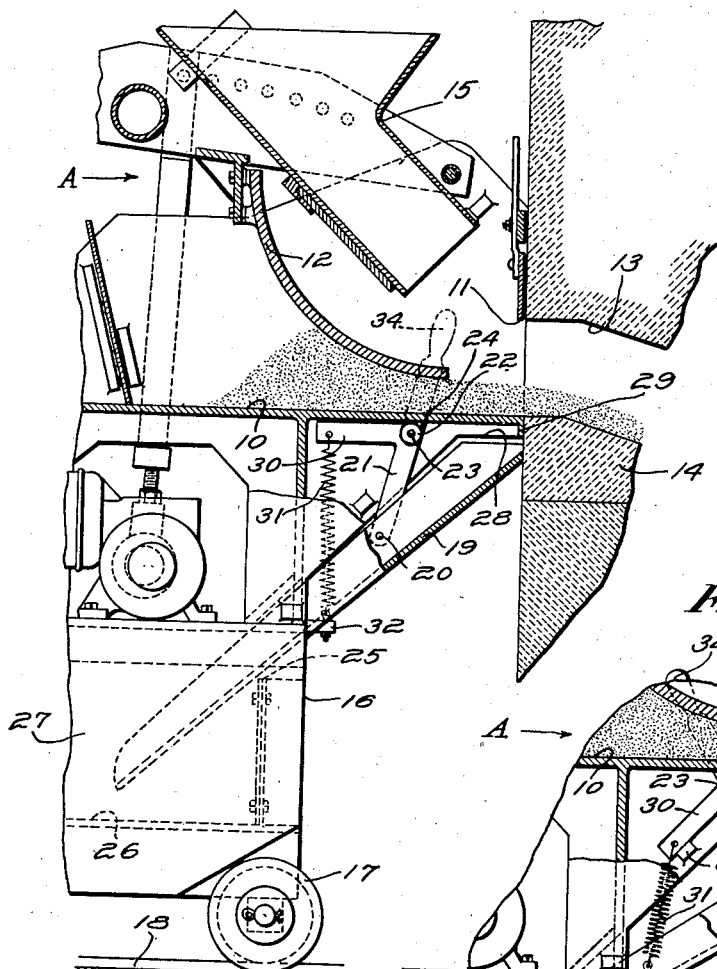
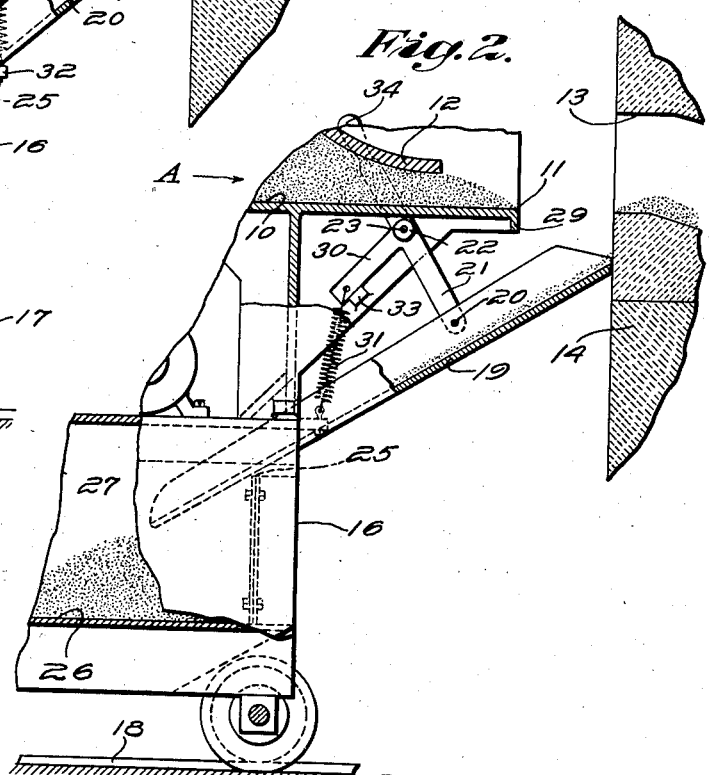
Witness:
W. B. Thayer.
Inventor:
Charles H. Wise
by Brown & Parham
Attorneys Patented Feb. 11, 1936

2,030,808

UNITED STATES PATENT OFFICE 2,030,808

SPILLED BATCH CATCHER

Charles H. Wise, Hartford, Conn., assignor to Hartford-Empire Company, Hartford, Conn., a corporation of Delaware Application December 15, 1934, Serial No. 757,592

5 Claims. (Cl. 214—18)

This invention relates generally to apparatus for feeding glass making materials or batch to glass melting tanks or furnaces, and more particularly to mechanism for catching batch in the space that will exist between a wall of a glass melting furnace or tank and a movable associate batch feeding apparatus when such apparatus is withdrawn from batch feeding relation with the furnace or tank.

An object of the invention is to provide a simple, reliable and efficient device which will be inactive and in an out-of-the-way position when a portable batch feeding apparatus with which the device is used is disposed in batch feeding relation with a glass melting furnace or tank, and will be moved automatically to position to catch the falling batch in the gap between the batch feeding apparatus and the furnace or tank as such batch feeding apparatus is moved away from the furnace or tank.

Other objects and advantages of the invention will hereinafter be pointed out or will become apparent from the following description of a particular practical embodiment of the invention as shown in the accompanying drawing, in which:

Figure 1 is a fragmentary view mainly in vertical section and partly in side elevation, showing a spilled batch catcher embodying the invention as applied to a movable batch feeding apparatus for feeding batch through an inlet passage in a vertical wall, which may be the wall of a glass melting tank or furnace, the view showing the batch catcher in inactive out-of-the-way position and the batch feeding apparatus in feeding relation with the inlet passage.

Fig. 2 is a fragmentary view generally similar to Fig. 1 but showing the batch catcher in its active position and the batch feeding apparatus withdrawn from feeding relation with the inlet passage.

In Figure 1, a batch feeding apparatus, generally designated A, includes a batch feed chamber 10 having a feed outlet 11 at its front. A batch feeding member 12, working in the chamber 10, is adapted to feed batch from the chamber 10 through the outlet 11 into and through an inlet passage 13 in a vertical wall 14, representing a wall of the glass melting furnace, or the like, when the front of the batch feeding chamber is positioned against the wall 14, so that the outlet 11 is in register with and, in effect, forms an outward continuation of inlet passage 13. The batch may be supplied to the feed chamber 10 through a hopper 15.

For movably supporting the batch feeding chamber 10 so that its outlet may be moved to and from batch feeding relation with the inlet passage 13, the batch feeding apparatus may include a supporting carriage 16, mounted on wheels, such as that indicated at 17. The wheels of the carriage 16 may move on rails, such as that indicated at 18, appropriately positioned to permit the batch feeding chamber to be moved into contact with the wall 14, as shown in Fig. 1, or directly away from such wall.

The movable batch feeding apparatus described so far and as shown in part in the drawing is substantially as disclosed in Patent No. 1,941,897, granted January 2, 1934, to the Hartford-Empire Company as assignee of E. O. Hiller. Any suitable batch feeding apparatus may be employed, as the present invention does not reside in the provision of any particular batch feeding apparatus or of any particular means for movably supporting such apparatus, but in the provision of a suitable spilled batch catcher for use in conjunction with a batch feeding apparatus for catching and collecting falling batch that otherwise not only would be scattered and wasted but might cause injury to adjacent machinery and discomfort to workmen.

In carrying out the invention, I may make use of an elongate trough or chute 19. This trough or chute may be movably suspended from framework of the batch feeding apparatus, as by being pivotally connected at 20 with an arm 21 of a bell crank lever 22, which is supported by a horizontal pivot shaft 23 that is mounted in depending lugs, such as that indicated at 24, on the bottom of the batch feeding chamber 10. The point of pivotal connection of the suspending arm 21 with the chute 19 may be nearer to one end of the chute 19 than to its opposite end, so that the chute will tend to swing to a vertical position. The lower end portion of the chute may rest on a horizontal support 25, which may be a transverse structural element of the carriage 16. With this arrangement, the chute will be movably supported in an inclined position, with its upper end below and close to the bottom of the batch feeding chamber 10 at the front of the latter and with its lower end in position to discharge onto a supporting surface 26, which may be the bottom of a receptacle 27 that may be included in or carried by the carriage 16.

A substantially horizontal surface 28 preferably is provided at the upper end of the chute 19 for contact with a depending flange 29 at the bottom of the feed outlet 11 when the feed chamber 20 is in batch feeding relation with the furnace wall 14 and the chute is in its retracted inactive position as shown in Fig. 1. At this time, the uppermost edge of the bottom of the inclined chute bears against the wall 14 below the juncture of the outlet 11 and the inlet passage 13.

The second arm, indicated at 30, of the bell crank lever 22 may be connected by a retractile spring 31 with a lug or bracket 32 on the carriage 16. This spring 31 tends to swing the bell crank lever 22 in a counterclockwise direction about the pivot shaft 23 and thus will be effective to maintain the chute 19 in the position shown in Fig. 1 when the batch feeding apparatus is positioned against the wall 14, as shown. Also, when the batch feeding apparatus is being moved from the position shown in Fig. 1 to that shown in Fig. 2, the spring 31 will tend to project the chute 19 forwardly and thus will maintain it against the wall 14 so that it will assume the position shown in Fig. 2 when the batch feeding apparatus has been retracted as shown. Consequently, batch falling from the outer end of the inlet passage 13 and from the outlet 11 of the batch feeding chamber will be caught in the chute 19, as shown in Fig. 2, and delivered to the supporting surface 26, constituting the bottom of the receptacle 27, from which it may be removed and transferred to the source of supply of batch. Batch that otherwise would be scattered and wasted thus is reclaimed. As batch may contain considerable dust or finely divided, powdery substances, loose batch is a source of annoyance and discomfort to workmen and of possible injury to or impairment of adjacent machinery.

The extent of relative fore-and-aft movements between the chute 19 and the batch feeding apparatus may be limited by providing a stop 33 against which the arm 31 of the bell crank 22 will be moved when a predetermined counterclockwise swinging movement of the lever 22 has been effected. Preferably, this stop is so positioned that relative movement between the carriage 16 and the chute or trough 19 will continue as the batch feeding apparatus is retracted as long as is required to catch all the loose batch that will be spilled from the inlet passage 13 in the wall 14.

When the carriage 16 is returned toward the wall 14, as required to again position the outlet 11 against the outer end of the inlet passage 13, the contact or engagement of the outer end of the chute 19 with the furnace wall 14 will return the chute 19 to its retracted inactive position, against the action of the spring 31, as shown in Fig. 1. If desired, this retractive movement of the chute 19 may be aided or effected entirely by manual operation. To this end, the bell crank 22 may be provided with a handle 34 in position to be grasped and manipulated conveniently when desired.

Instead of mounting the spilled batch catcher on the movable carriage or framework of the batch feeding apparatus, the same may be mounted on any other suitable supporting structure adjacent to the place of engagement of the batch feed chamber with the furnace wall 14, as on framework of the furnace wall, so as to catch batch in the gap between the furnace wall and the outlet of the batch feeding chamber when such chamber is being withdrawn. Also, the chute may deliver to any suitable receptacle the spilled batch that it catches.

I claim:

1. The combination with a batch feeding apparatus having a feed outlet and mounted for movement to and from position to dispose said feed outlet in batch feeding relation with an inlet passage in a wall of a glass melting furnace or like structure, a loose batch catcher movably supported beneath said batch feeding apparatus when the latter is in batch feeding relation with said inlet passage, and means acting automatically to position said loose batch catcher beneath the gap created between the feed outlet and said inlet passage when said batch feeding apparatus is moved away from said wall.

2. In combination, a batch feeding chamber having an outlet, a carriage supporting said batch feeding chamber for movement to and from position to dispose said outlet in batch feeding relation with an inlet passage in the wall of a melting furnace or like structure, an inclined chute pivotally supported on said carriage in position to contact at its upper end with said wall at a place directly beneath the outer end of said inlet passage, and means acting automatically to maintain said chute in position to receive batch falling between the outlet of the batch feeding chamber and said inlet passage when said carriage is moved to withdraw said outlet from batch feeding relation with said inlet passage.

3. In combination, a batch feeding chamber having an outlet, a carriage supporting said batch feeding chamber for movement to and from position to dispose said outlet in batch feeding relation with an inlet passage in the wall of a melting furnace or like structure, an inclined chute pivotally supported on said carriage in position to contact at its upper end with said wall at a place directly beneath the outer end of said inlet passage, means acting automatically to maintain said chute in position to receive batch falling between the outlet of the batch feeding chamber and said inlet passage when said carriage is moved to withdraw said outlet from batch feeding relation with said inlet passage, said means being of such character as to permit such chute to be disposed beneath said batch feeding chamber and in contact at its upper end with said wall when said carriage is moved to return the outlet of said batch feeding chamber to batch feeding relation with said inlet passage.

4. In combination, a batch feeding chamber having an outlet, a carriage supporting said batch feeding chamber for movement to and from position to dispose said outlet in batch feeding relation with an inlet passage in the wall of a melting furnace or like structure and against said wall, an inclined chute pivotally supported on said carriage in position to contact at its upper end with said wall at a place directly beneath the outer end of said inlet passage, means acting automatically to maintain said chute in position to receive batch falling between the outlet of the batch feeding chamber and said inlet passage when said carriage is moved to withdraw said outlet from batch feeding relation with said inlet passage, and a receptacle carried by such carriage for receiving batch from said chute.

5. In combination, a batch feeding chamber having an outlet, a carriage supporting said batch feeding chamber for movement toward and from a wall of a glass melting furnace or the like, said wall having an inlet passage, said batch feeding chamber having an outlet adapted to register with and in effect form an outward continuation of said inlet passage when said batch feeding chamber has been moved against said wall, a downwardly and rearwardly inclined chute movably supported on said carriage, the upper end of said chute being disposed beneath the outlet portion of said batch feed chamber, spring pressed means acting on said chute to maintain the upper end of said chute against said wall beneath the outlet of said batch feeding chamber when said batch feeding chamber is in contact with said wall and to resist movement of the upper end of such chute away from said wall when said batch feeding chamber is withdrawn from contact with said wall, and manually operable means for moving said chute against the resistance of said spring pressed means.

CHARLES H. WISE.